US012283426B2

(12) United States Patent
Hyun et al.

(10) Patent No.: US 12,283,426 B2
(45) Date of Patent: Apr. 22, 2025

(54) ELECTRONIC COMPONENT

(71) Applicant: SAMSUNG ELECTRO-MECHANICS CO., LTD., Suwon-si (KR)

(72) Inventors: Mina Hyun, Suwon-si (KR); Beomjoon Cho, Suwon-si (KR); Hyeok Jin Park, Suwon-si (KR); Won Young Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 128 days.

(21) Appl. No.: 17/978,654

(22) Filed: Nov. 1, 2022

(65) Prior Publication Data
US 2023/0223192 A1 Jul. 13, 2023

(30) Foreign Application Priority Data
Jan. 11, 2022 (KR) ........................ 10-2022-0003894

(51) Int. Cl.
H01G 2/02 (2006.01)
H01G 4/228 (2006.01)
H01G 4/30 (2006.01)

(52) U.S. Cl.
CPC ............... *H01G 2/02* (2013.01); *H01G 4/228* (2013.01); *H01G 4/30* (2013.01)

(58) Field of Classification Search
CPC .......... H01G 2/02; H01G 4/228; H01G 4/248; H01G 4/30
USPC ...................... 361/301.4, 306.3, 321.3, 308.3
See application file for complete search history.

(56) References Cited

U.S. PATENT DOCUMENTS

| 6,191,933 | B1* | 2/2001 | Ishigaki | H05K 3/3426 |
| | | | | 361/309 |
| 2005/0041367 | A1 | 2/2005 | Yoshii et al. | |
| 2015/0187495 | A1* | 7/2015 | Maeda | H01G 4/30 |
| | | | | 361/303 |
| 2017/0287645 | A1* | 10/2017 | Masuda | H01G 4/248 |
| 2019/0164694 | A1* | 5/2019 | Ando | H01G 4/12 |
| 2019/0164695 | A1 | 5/2019 | Cho | |
| 2022/0020533 | A1* | 1/2022 | Iguchi | H01G 2/065 |
| 2022/0084750 | A1* | 3/2022 | Miyauchi | H01G 4/224 |

FOREIGN PATENT DOCUMENTS

| JP | H11-329893 | A | 11/1999 |
| JP | 2004-273935 | A | 9/2004 |
| JP | 3883528 | B2 | 2/2007 |
| JP | 4605329 | B2 | 1/2011 |
| KR | 10-2019-0060312 | A | 6/2019 |

* cited by examiner

*Primary Examiner* — Arun Ramaswamy
(74) *Attorney, Agent, or Firm* — Morgan, Lewis & Bockius LLP

(57) ABSTRACT

An electronic component according to an embodiment includes a multilayer capacitor, a frame terminal, and a conductive bonding portion. An area in which the conductive bonding portion contacts the frame terminal is larger than an area in which it contacts with the external electrode.

19 Claims, 8 Drawing Sheets

ELECTRONIC COMPONENT

CROSS-REFERENCE TO RELATED APPLICATION

This application claims priority to and the benefit of Korean Patent Application No. 10-2022-0003894 filed in the Korean Intellectual Property Office on Jan. 11, 2022, the entire contents of which are incorporated herein by reference.

TECHNICAL FIELD

The present disclosure relates to an electronic component.

BACKGROUND

Multilayer capacitors are used in various electronic devices because they are small and have high capacity.

Recently, as eco-friendly cars and electric cars have rapidly emerged, electric power driving systems inside the cars are increasingly important. Accordingly, multilayer capacitors used in the electric power driving systems for cars are also increasingly demanded.

In order for the multilayer capacitors to be used as parts for automobiles, high levels of thermal reliability, electrical reliability, and mechanical reliability are required.

In particular, there is a demand for a multilayer capacitor easily installed in a limited space inside a car, realizing high capacity, and having excellent durability against vibration and deformation.

A conventional multilayer capacitor is mounted on a board by directly contacting a capacitor body with the board by solder. Accordingly, since heat or mechanical deformation generated in the board is directly transferred to the multilayer capacitor, a high level of reliability is difficult to secure.

The direct transfer of stress from the board to the multilayer capacitor may be blocked in a method of bonding a frame terminal on one surface of the multilayer capacitor to secure a space between the multilayer capacitor and the mounting board.

However, this method creates new bonding interfaces among the frame terminal, a conductive bonding portion, and the capacitor body, which may generate thermal stress due to a difference in coefficients of thermal expansion between the interfaces under environmental conditions such as temperature cycles and the like and thus physical and electrical defects.

Accordingly, a structure capable of overcoming the deterioration of the bonding interfaces due to the difference in coefficients of thermal expansion at each interface as well as protecting the multilayer capacitor from the external stress by bonding the frame terminal to the multilayer capacitor is required.

SUMMARY

An embodiment of the present disclosure provides an electronic component which is capable of suppressing deterioration of a bonding interface due to thermal stress caused by a difference in coefficients of thermal expansion between a multilayer capacitor and a conductive bonding portion, while maintaining bonding strength between a frame terminal and the multilayer capacitor, in a structure for protecting the multilayer capacitor from external stress by means of a frame terminal.

According to an embodiment, an electronic component includes: a multilayer capacitor including a capacitor body and an external electrode disposed on one surface of the capacitor body; a frame terminal disposed outside the external electrode; and a conductive bonding portion disposed between the external electrode and the frame terminal.

An area in which the conductive bonding portion contacts the frame terminal may be larger than an area in which the conductive bonding portion contacts the external electrode.

The conductive bonding portion may be in continuous contact with the frame terminal.

The conductive bonding portion may be in discontinuous contact with the external electrode.

The conductive bonding portion may have a base portion contacting the frame terminal and a protruding portion disposed on one surface of the base portion and contacting the external electrode.

The base portion may be spaced apart from the external electrode.

An empty space may be disposed between the base portion and the external electrode.

The protruding portion may extend in one direction on the one surface of the base portion.

The protruding portion may extend along a width direction of the capacitor body.

The protruding portion may extend along a thickness direction of the capacitor body.

The conductive bonding portion may have a plurality of protruding portions.

The plurality of protruding portions may be disposed to be spaced apart from each other on one surface of the base portion.

Two of the plurality of protruding portions may be disposed at both ends on the one surface of the base portion.

The plurality of protruding portions may have a patterned shape.

The plurality of protruding portions may have a stripe shape.

The plurality of protruding portions may have a mesh shape.

A ratio (A/B) of the average total area (A) of the protruding portions to the average total area (B) of the base portion may be greater than or equal to about 30% and less than about 100%.

According to another embodiment, an electronic component includes: a multilayer capacitor including a capacitor body and an external electrode disposed on one surface of the capacitor body; a frame terminal disposed outside the external electrode; and a conductive bonding portion disposed between the external electrode and the frame terminal. The conductive bonding portion may be in continuous contact with the frame terminal and in discontinuous contact with the external electrode.

The conductive bonding portion may have a base portion contacting the frame terminal and a protruding portion disposed on one surface of the base portion and contacting the external electrode.

The conductive bonding portion may have a plurality of protruding portions.

The plurality of protruding portions may be disposed to be spaced apart from each other on the one surface of the base portion.

According to another embodiment, an electronic component includes: a multilayer capacitor including a capacitor body, and an external electrode disposed on one surface of the capacitor body; a frame terminal disposed outside the external electrode; and a conductive bonding portion disposed between the external electrode and the frame terminal. The conductive bonding portion may include a portion being in contact with the frame terminal and spaced apart from the external electrode.

The electronic component according to an embodiment is capable of suppressing deterioration of a bonding interface due to thermal stress caused by a difference in coefficients of thermal expansion between a multilayer capacitor and a conductive bonding portion, while maintaining bonding strength between the frame terminal and the multilayer capacitor, in a structure for protecting the multilayer capacitor from external stress by means of a frame terminal.

DETAILED DESCRIPTION

Figure 1:
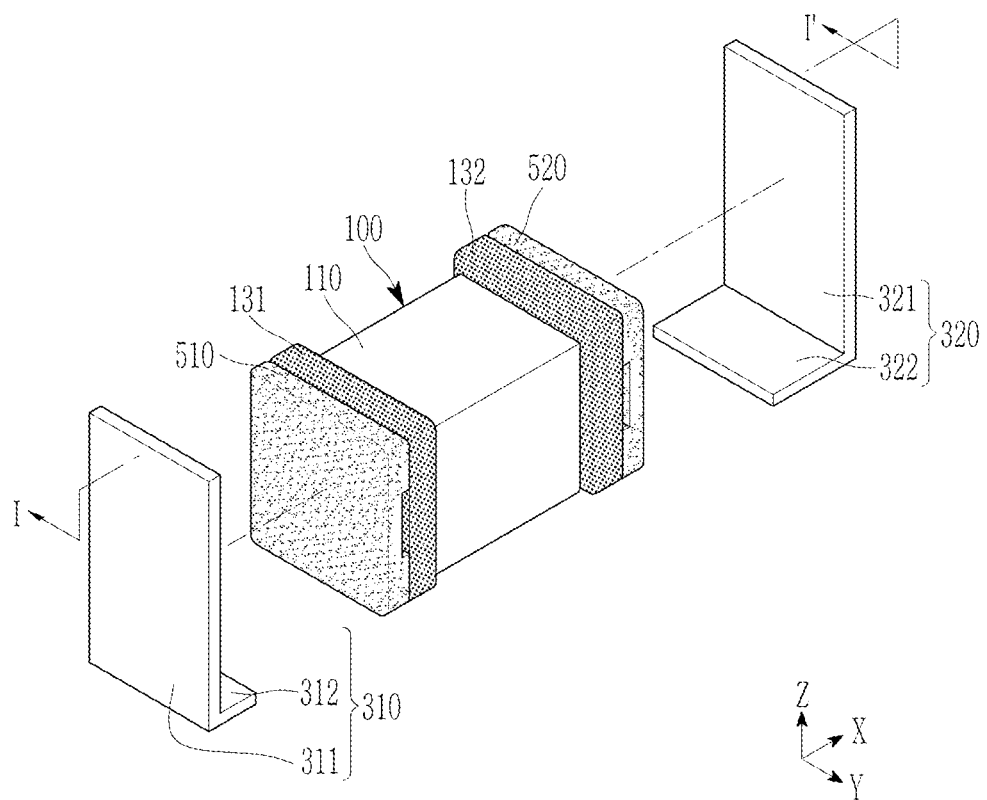
FIG. 1 is a partially exploded perspective view illustrating an electronic component according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
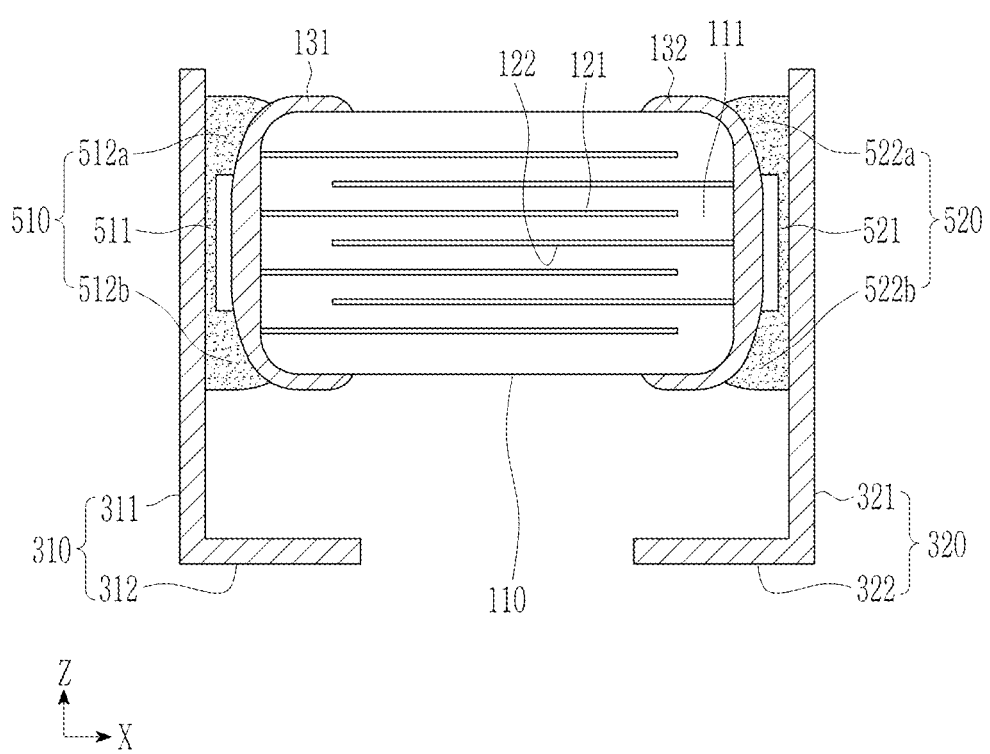
FIG. 2 is a cross-sectional view of the electronic component taken along line I-I' of FIG. 1.
Figure 3:
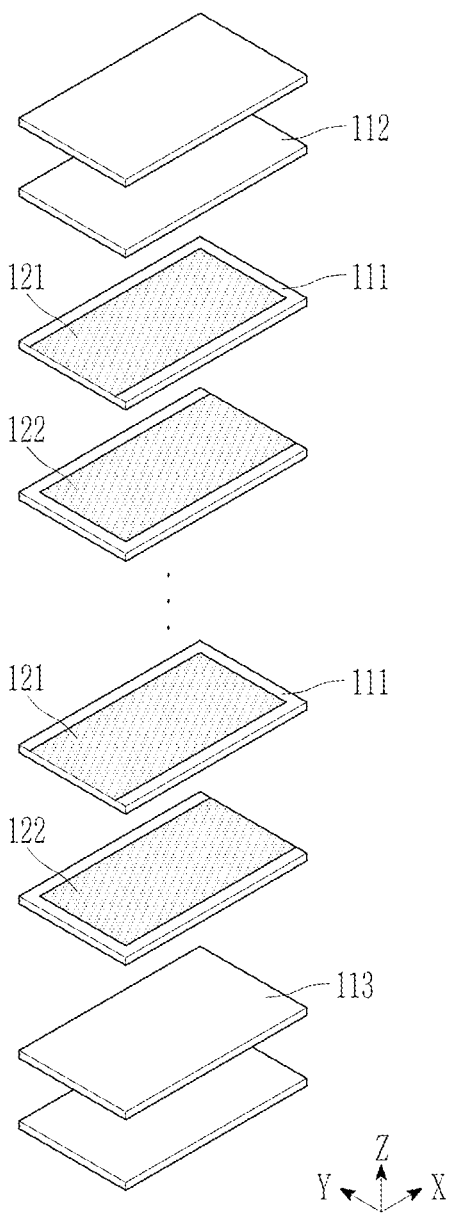
FIG. 3 is an exploded perspective view illustrating a stacked structure of internal electrodes in the capacitor body of FIG. 1.
Figure 4:
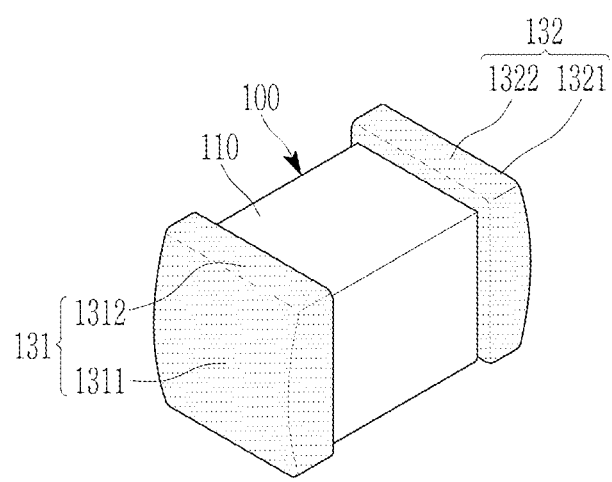
FIG. 4 is a perspective view illustrating the multilayer capacitor of FIG. 1.

FIG. 1 is a partially exploded perspective view illustrating an electronic component according to an embodiment, FIG. 2 is a cross-sectional view of the electronic component taken along line I-I' of FIG. 1, FIG. 3 is an exploded perspective view illustrating a stacked structure of internal electrodes in the capacitor body of FIG. 1, and FIG. 4 is a perspective view illustrating the multilayer capacitor of FIG. 1.

In order to clearly describe the present embodiment, X, Y, and Z directions in the drawings are respectively defined as a length direction, a width direction, and a thickness direction of a capacitor body 110. Herein, the thickness direction (Z direction) may be used in the same concept as a stacking direction in which dielectric layers 111 are stacked. The length direction (X direction) may be defined as an approximately perpendicular direction with respect to the thickness direction (Z direction), and the width direction (Y direction) may be defined as an approximately vertical direction with respect to the thickness direction (Z direction).

Referring to FIGS. 1 to 4, an electronic component according to the present embodiment may include a multilayer capacitor 100, first and second frame terminals 310 and 320, and first and second conductive bonding portions 510 and 520.

The multilayer capacitor 100 may include the capacitor body 110 and first and second external electrodes 131 and 132 disposed at both ends of the capacitor body 110 which face each other in the X direction.

The capacitor body 110 is formed by stacking a plurality of the dielectric layers 111 in the Z direction and then sintering them, and includes the plurality of dielectric layers 111 and a plurality of first and second internal electrodes 121 and 122 alternately interposed therebetween in the Z direction. Herein, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM). Also, the capacitor body 110 may include an active region and cover regions 112 and 113.

The active region contributes to forming capacitance of the multilayer capacitor 100. For example, the active region is a region where the first and second internal electrodes 121 and 122 are overlapped each other along the Z direction.

The cover regions 112 and 113 are margin portions, which may be respectively provided at upper and lower portions of the active region in the Z direction. These cover regions 112 and 113 are respectively provided by stacking a single dielectric material layer or two or more dielectric material layers on the upper and lower surfaces of the active region.

In addition, the cover regions 112 and 113 may serve to prevent damage to the first and second internal electrodes 121 and 122 by physical or chemical stress.

For example, this capacitor body 110 may have a substantially hexahedral shape.

In the present embodiment, for better understanding and ease of description, both surfaces of the capacitor body 110 facing each other in the Z direction are defined as first and second surfaces, the surfaces thereof facing each other in the X direction and connected to the first and second surfaces are defined as third and fourth surfaces, and the surfaces connected to the first and second surfaces and also to the third and fourth surfaces and facing each other in the Y direction are defined as fifth and sixth surfaces. For example, the first surface, which is a bottom surface, may be a surface facing a mounting direction. The shape and dimensions of the capacitor body 110 and the number of stacked dielectric layers 111 are not limited to those shown in the drawings of the present embodiment.

For example, the dielectric layer 111 may include a ceramic material with a high dielectric constant. For example, the ceramic material may include a dielectric material ceramic including a component such as $BaTiO_3$, $CaTiO_3$, $SrTiO_3$, $CaZrO_3$, or the like. Further, in addition to these components, auxiliary components such as a Mn compound, an Fe compound, a Cr compound, a Co compound, a Ni compound, and the like may be further included. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$-based dielectric material ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm.

The first and second internal electrodes 121 and 122 are electrodes having different polarities, are alternately disposed to face each other in the Z direction with the dielectric layer 111 in the middle, and one of ends thereof may be exposed through the third and fourth surfaces of the capacitor body 110.

The first and second internal electrodes 121 and 122 may be electrically insulated by the dielectric layer 111 disposed therebetween.

The ends of the first and second internal electrodes 121 and 122 alternately exposed through the third and fourth surfaces of the capacitor body 110 may be electrically connected to the first and second external electrodes 131 and 132, respectively.

The first and second internal electrodes 121 and 122 may include a conductive metal, for example, a metal such as Ni, Cu, Ag, Pd, Au, and the like or an alloy thereof, for example, an Ag—Pd alloy.

In addition, the first and second internal electrodes 121 and 122 may include dielectric material particles having the same composition as the ceramic material included in the dielectric layer 111.

The first and second internal electrodes 121 and 122 may be formed by using a conductive paste including a conductive metal. The printing method of the conductive paste may include a screen printing method or a gravure printing method.

For example, the first and second internal electrodes 121 and 122 may have an average thickness of about 0.1 μm to about 2 μm.

According to the above configuration, when a predetermined voltage is applied to the first and second external electrodes 131 and 132, charges are accumulated between the first and second internal electrodes 121 and 122.

Herein, capacitance of the multilayer capacitor 100 is proportional to an overlapped area of the first and second internal electrodes 121 and 122 overlapped along the Z direction in the active region.

The first and second external electrodes 131 and 132 may be provided with voltages having different polarities and electrically connected to the exposed portions of the first and second internal electrodes 121 and 122, respectively.

The first and second external electrodes 131 and 132 may respectively include first and second connection portions 1311 and 1321 disposed on the third and fourth surfaces of the capacitor body 110 and respectively connected to the first and second internal electrodes 121 and 122, and also first and second band portions 1312 and 1322 disposed at corners where the first and second surfaces of the capacitor body 110 meet the third and fourth surfaces thereof.

The first and second band portions 1312 and 1322 may extend from the first and second connection portions 1311 and 1321 to portions of the first and second surfaces of the capacitor body 110, respectively. The first and second band portions 1312 and 1322 may respectively further extend from the first and second connection portions 1311 and 1321 to the portions of the fifth and sixth surfaces of the capacitor body 110. The first and second band portions 1312 and 1322 may serve to improve adhesion strength of the first and second external electrodes 131 and 132.

For example, the first and second external electrodes 131 and 132 may respectively include first and second base electrodes in contact with the capacitor body 110, and also first and second terminal electrodes respectively covering the first and second base electrodes.

The first and second base electrodes may include copper (Cu). In addition, the first and second base electrodes may include a conductive paste including copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first and second base electrodes may be formed in a method of dipping the capacitor body 110 in a conductive paste including a conductive metal and glass, printing the conductive paste on the surface of the capacitor body 110 through screen printing, gravure printing, or the like, and coating the conductive paste on the surface of the capacitor body 110 or transferring a dry film formed by drying the conductive paste onto the capacitor body 110.

The first and second base electrodes are formed of the aforementioned conductive paste and thus may increase density of the first and second external electrodes 131 and 132 due to the glass added thereto as well as maintain sufficient conductivity, and thereby effectively suppress penetration of a plating solution and/or external moisture.

For example, the glass component included in the first and second base electrodes may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

For example, the first and second terminal electrodes may include nickel (Ni) as a main component, and may further include copper (Cu), tin (Sn), palladium (Pd), platinum (Pt), gold (Au), silver (Ag), tungsten (W), titanium (Ti), or lead (Pb) alone or as alloy thereof. The first and second terminal electrodes may improve mountability of the multilayer capacitor 100 on a board, structural reliability, external durability, heat resistance, and equivalent series resistance (ESR).

For example, the first and second terminal electrodes may be formed through plating. The first and second terminal electrodes may be formed through sputtering or electroplating (electric deposition).

The multilayer capacitor 100 may be disposed between the first and second supporting portions 311 and 321. For example, the first and second supporting portions 311 and 321 may respectively be disposed outside of the first and second external electrodes 131 and 132 in the X direction.

The first frame terminal 310 may include a first supporting portion 311 extended in the Z direction and a first mounting portion 312 extended from a lower end of the first supporting portion 311 in the X direction. The second frame terminal 320 may include a second supporting portion 321 facing the first supporting portion 311 and extended in the Z direction, and a mounting portion 322 extended from a lower end of the second supporting portion 321 in the X direction.

According to this structure, the first and second frame terminals 310 and 320 may mainly have an 'L' shape, and each end of the first and second frame terminals 310 and 320 may be disposed to face each other in the X direction.

The first and second frame terminals 310 and 320 may be formed of the base material including Ni, Fe, Cu, Ag, Cr, or an alloy thereof. For example, the first and second frame terminals 310 and 320 may include an Fe-42Ni alloy or an Fe-18Cr alloy.

For example, the first and second frame terminals 310 and 320 may have an average thickness of about 0.05 mm to about 0.5 mm.

The first and second external electrodes 131 and 132 of the multilayer capacitor 100 may respectively be electrically connected to the first and second frame terminals 310 and 320. For this connection, the electronic component may include first and second conductive bonding portions 510 and 520.

The first conductive bonding portion 510 may be disposed between the first external electrode 131 and the first frame terminal 310, while the second conductive bonding portion 520 is disposed between the second external electrode 132 and the second frame terminal 320.

For example, the first and second conductive bonding portions 510 and 520 may include a solder or a conductive adhesive such as a conductive resin paste and the like. The solder may be Sn—Sb-based, Sn—Ag—Cu-based, Sn—Cu-based, Sn—Bi-based, or the like, and for example, the Sn—Sb-based solder may include Sb in amount of greater than or equal to about 5% and less than or equal to about 15%.

One surface of the first conductive bonding portion 510 may be in contact with the first external electrode 131, while the other surface thereof may be in contact with the first frame terminal 310. One surface of the second conductive bonding portion 520 may be in contact with the second external electrode 132, while the other surface thereof may be in contact with the second frame terminal 320.

Herein, the first and second external electrodes 131 and 132 and the first and second conductive bonding portions 510 and 520 may have a difference in coefficients of thermal expansion, which may cause thermal stress deteriorating bonding interfaces.

This problem may be solved by reducing areas where the first and second conductive bonding portions 510 and 520 are in contact with the first and second external electrodes 131 and 132. However, when the areas where the first and second conductive bonding portions 510 and 520 are in contact with the first and second frame terminals 310 and 320 are equally reduced, bonding strength between the multilayer capacitor 100 and the first and second frame terminals 310 and 320 may also be deteriorated.

Accordingly, the electronic component according to the present embodiment is configured to have a larger area where the first conductive bonding portion 510 contacts the first frame terminal 310 than an area where the first conductive bonding portion 510 contacts the first external electrode 131 and a larger area in which the second conductive bonding portion 520 contacts the second frame terminal 320 than an area in which the second conductive bonding portion 520 contacts the area of the second external electrode 132.

This configuration may not only maintain bonding strength of the first and second frame terminals 310 and 320 with the multilayer capacitor 100 but also suppress the deterioration of the bonding interfaces due to thermal stress caused by a difference in coefficients of thermal expansion between the multilayer capacitor 100 and the first and second conductive bonding portions 510 and 520.

The first conductive bonding portion 510 has a first base portion 511 contacting the first frame terminal 310 and first protruding portions 512a and 512b disposed on one surface of the first base portion 511 and contacting the first external electrode 131, while the second conductive bonding portion 520 has a second base portion 521 contacting the second frame terminal 320 and second protruding portions 522a and 522b disposed on one surface of the second base portion 521 and contacting the second external electrode 132.

For example, the first and second base portions 511 and 521 may in general have a flat rectangular parallelepiped shape. The first and second base portions 511 and 521 have a rectangular shape extending in the Y direction and the Z direction and a flat thickness in the X direction. Accordingly, the first base portion 511 may continuously contact the first frame terminal 310, and the second base portion 521 may continuously contact the second frame terminal 320.

The first protruding portions 512a and 512b are disposed on one surface of the first base portion 511, for example, on the surface of the first base portion 511 facing the monovalent multilayer capacitor 100, and the second protruding portions 522a and 522b are disposed on one surface of the second base portion 521, for example, on the surface of the second base portion 521 facing the multilayer capacitor 100.

Herein, the first protruding portions 512a and 512b may be disposed in a partial region of one surface of the first base portion 511 but not in the entire region of one surface of the first base portion 511. Similarly, the second protruding portions 522a and 522b are disposed in a partial region of one surface of the second base portion 521 but not in the entire region of the second base portion 521.

The first protruding portions 512a and 512b may be protruded on one surface of the first base portion 511 toward the first external electrode 131, that is, in the X direction, and the second protruding portions 522a and 522b may be protruded on the second base portion 521 toward the second external electrode 132, that is, in the X direction.

In addition, the first protruding portions 512a and 512b may have a rectangular shape with a specific area to be in contact with the first external electrode 131, and the second protruding portions 522a and 522b may have a rectangular shape with a specific area to be in contact with the second external electrode 132. For example, the first and second protruding portions 512a, 512b, 522a, and 522b may have a rectangular shape extended in the Y direction and the Z direction.

Since the first protruding portions 512a and 512b protruded from the first base portion 511 contact the first external electrode 131, the first base portion 511 may not contact the first external electrode 131, and the first conductive bonding portion 510 may have an empty space between the first base portion 511 and the first external electrode 131. Similarly, since the second protruding portions 522a and 522b protruded from the second base portion 521 contact the second external electrode 132, the second base portion 521 may not contact the second external electrode 132, and the second conductive bonding portion 520 may have an empty space between the second base portion 521 and the second external electrode 132. The empty spaces may serve to buffer thermal stress generated by a difference in coefficients of thermal expansion between the multilayer capacitor 100 and the first and second conductive bonding portions 510 and 520.

In this configuration, the first and second conductive bonding portions 510 and 520 are in contact with the first and second frame terminals 310 and 320 at larger areas than with the first and second external electrodes 131 and 132, which may not only maintain bonding strength between the first and second frame terminals 310 and 320 and the multilayer capacitor 100 but also suppress the deterioration of bonding interfaces by thermal stress generated by a difference in coefficients of thermal expansion of the multilayer capacitor 100 and the first and second conductive bonding portions 510 and 520.

Figure 5:
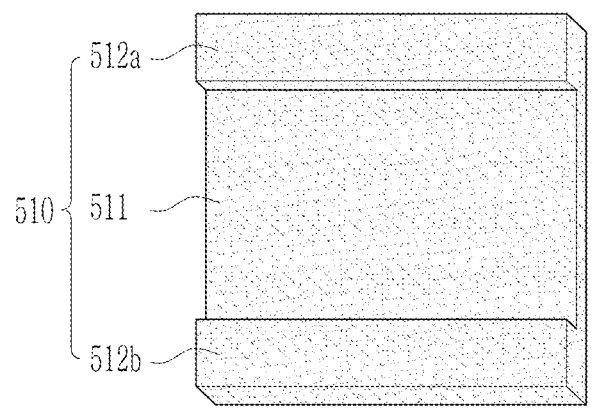
FIG. 5 is a perspective view illustrating an example of the conductive bonding portion of FIG. 1.

FIG. 5 is a perspective view illustrating an example of the first conductive bonding portion 510 of FIG. 1. FIG. 5 is a perspective view of the first conductive bonding portion 510 viewed in the X direction in FIG. 1. Hereinafter, the first conductive bonding portion 510 will be mainly described, but the second conductive bonding portion 520 may also have the same shape as the first conductive bonding portion 510.

Referring to FIG. 5, the first protruding portions 512a and 512b may have a long quadrangular shape that is much extended in one direction. For example, since the first protruding portions 512a and 512b are extended along a width direction (Y direction) of the capacitor body 110, a length thereof may be longer in the Y direction length than in the Z direction. However, since the first protruding portions 512a and 512b are extended along a thickness direction of the capacitor body 110, a length thereof may be longer in the Z direction than in the Y direction.

The first protruding portions 512a and 512b may extend from one end to the other end on the first base portion 511 and cross the first base portion 511. For example, in FIG. 5, the first protruding portions 512a and 512b may extend from one end to the other end in the Y direction on the first base portion 511 and cross the first base portion 511.

The first conductive bonding portion 510 may have a plurality of the first protruding portions 512a and 512b.

The plurality of first protruding portions 512a and 512b may be spaced apart from each other at intervals along the Y direction and/or the Z direction on one surface of the first base portion 511. Herein, the plurality of first protruding portions 512a and 512b may be spaced at regular or irregular intervals. Accordingly, the first conductive bonding portion 510 may discontinuously contact the first external electrode 131.

In addition, the areas where the first protruding portions 512a and 512b contact the first external electrode 131 may be the same as or different from each other.

Two of the plurality of the first protruding portions 512a and 512b may be respectively disposed at both of opposite ends on one surface of the first base portion 511. For example, referring to FIG. 6, the first protruding portions 512a and 512b may be spaced apart along the Z direction. One first protruding portion 512a may be disposed at one end in the Z direction on the first base portion while the other first protruding portion 512b may be disposed at the other opposite end in the Z direction.

Figure 6:
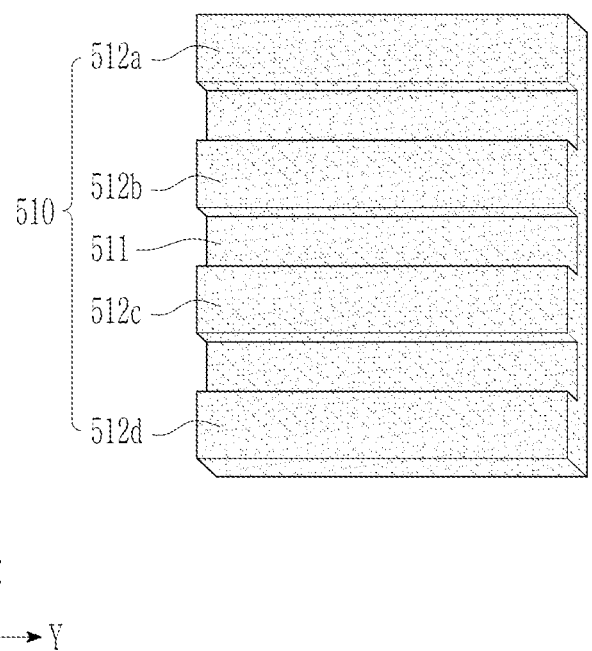
FIG. 6 is a perspective view illustrating another example of the conductive bonding portion of FIG. 1.

FIG. 6 is a perspective view illustrating another example of the first conductive bonding portion 510 of FIG. 1. FIG. 6 is a perspective view of the first conductive bonding portion 510 viewed in the X direction in FIG. 1. Hereinafter, the first conductive bonding portion 510 is mainly described, but the second conductive bonding portion 520 may have the same shape as the first conductive bonding portion 510.

Referring to FIG. 6, the plurality of first protruding portions 512a, 512b, 512c, and 512d may have a patterned shape. For example, the plurality of first protruding portions 512a, 512b, 512c, and 512d, as shown in FIG. 6, may have stripe shapes respectively extended along the Y direction and disposed at intervals in the Z direction. In addition, the plurality of first protruding portions 512a, 512b, 512c, and 512d may have a mesh shape further including the stripe shapes extended along the Z direction and disposed at intervals in the Y direction.

Hereinafter, the first base portion 511 and the first protruding portions 512a and 512b are mainly described, which may be equally applied to the second base portion 521 and the second protruding portions 522a and 522b.

An average total area (B) of the first base portion 511 is larger than an average total area (A) of the first protruding portions 512a and 512b. The average total area (B) of the first base portion 511 is an average of the total area where the first base portion 511 contacts the first frame terminal 310, and the average total area (A) of the first protruding portions 512a and 512b is an average of total areas where the first protruding portions 512a and 512b contact the first external electrode 131.

The total areas of the first protruding portions 512a and 512b, as shown in FIG. 5, may be calculated by a sum of the areas of the first protruding portions 512a and 512b on one cross-section (a cross-section in the Y direction and the Z direction) generally perpendicular to the X direction, and the average total area (A) of the first protruding portions 512a and 512b may be an arithmetic mean of the total areas of the first protruding portions 512a and 512b on any of 3, 5, or 10 cross-sections located at predetermined intervals along the X direction. The cross-sections disposed at the predetermined intervals along the X direction may be any cross-sections sequentially exposed in the X direction according to a polishing degree, while the first conductive bonding portion 510 is polished in a plane direction substantially perpendicular to the X direction.

The total area of the first base portion 511 is a sum of areas of regions where the first protruding portions 512a and 512b are not present and areas of regions where the first protruding portions 512a and 512b are present. For convenience, the total area of the first base portion 511 may be a sum of the total areas of the first protruding portions 512a and 512b and the areas of the regions of the first base portion 511 where the first protruding portions 512a and 512b are not present.

The total area of the first base portion 511, as shown in FIG. 5, is an area of one cross-section (a cross-section in the Y direction and Z direction) substantially perpendicular to the X direction. The average total area (B) of the first base portion 511 may be an arithmetic mean of the total areas of any 3, 5, or 10 cross-sections of the first base portion 511 located at predetermined intervals along the X direction. The cross-sections located at the predetermined intervals along the X direction may be any cross-sections sequentially exposed along the X direction according to a polishing degree, while the first conductive bonding portion 510 is polished in a substantially vertical direction to the X direction.

A ratio (A/B) of the average total area (A) of the first protruding portions relative to the average total area (B) of the first base portion may be greater than or equal to about 30% and less than about 100%, for example, about 40% to about 90%, about 50% to about 90%, or about 60% to about 80%. An expression including the term "about" or the like may have the same meaning as an expression without "about" or the like, and may also indicate that a non-ideal situation due to, for example, a process error occurring in the manufacturing process, a positional deviation, a measurement error, or the like has been taken into consideration.

When the ratio (NB) of the average total area (A) of the first protruding portions 512a and 512b relative to the average total area (B) of the first base portion 511 is less than about 30%, an area where the first conductive bonding portion 510 contacts the first frame terminal 310 is reduced, deteriorating bonding strength of the multilayer capacitor 100 and the first frame terminal 310, but when the ratio (A/B) is about 100%, thermal stress may be generated by a difference in coefficients of thermal expansion between the first external electrode 131 and the first conductive bonding portion 510 and thus deteriorates bonding interfaces.

The above descriptions regarding the ratio (A/B) of the average total area (A) of the first protruding portions relative to the average total area (B) of the first base portion are described with reference to FIG. 5. As to the example shown in FIG. 6, the ratio (A/B) of the average total area (A) of the first protruding portions relative to the average total area (B) of the first base portion may be similarly obtained by using the plurality of first protruding portions 512a, 512b, 512c, and 512d to obtain the average total area (A) of the first protruding portions. Overlapped descriptions thus will be omitted to avoid redundancy.

Hereinafter, specific examples are presented. However, the examples described below are only for specifically illustrating or explaining the invention, and the scope of the invention is not limited thereto.

Preparation Example: Manufacture of Electronic Component

Example 1

An electronic component was manufactured, as shown in FIG. 1, by bonding a multilayer capacitor (L×W×T=3.2 mm×2.5 mm×2.5 mm) to a frame terminal by using a conductive bonding portion, wherein, as shown in FIG. 5, the conductive bonding portion was configured to have a base portion continuously connected with the frame terminal and two protruding portions discontinuously connecting to the multilayer capacitor.

Example 2

An electronic component was manufactured, as shown in FIG. 1, by bonding a multilayer capacitor (L×W×T=3.2 mm×2.5 mm×2.5 mm) to a frame terminal by using a conductive bonding portion, wherein, as shown in FIG. 6, the conductive bonding portion was configured to have a base portion continuously connected with the frame terminal and four protruding portions discontinuously connecting to the multilayer capacitor.

Comparative Example 1

An electronic component was manufactured in the same manner as Example 1, except that the conductive bonding portion was configured to have the base portion alone and continuously bonded with both the frame terminal and the multilayer capacitor. Herein, a thickness (X direction length) of the base portion in Comparative Example 1 was the same as a sum of a thickness of the base portion and a thickness of the protruding portion in Example 1.

Reference Example 1

An electronic component was manufactured in the same manner as Example 1 except that the conductive bonding portion was configured to have the protruding portion without the base portion and discontinuously bonded with both the frame terminal and the multilayer capacitor. Herein, a thickness (X direction length) of the protruding portion in Reference Example 1 was the same as the thickness sum of the base portion and the protruding portion in Example 1.

In Comparative Example 1, the conductive bonding portion continuously contacted one whole surface of the multilayer capacitor. In Reference Example 1, the conductive bonding portion and the multilayer capacitor had a discontinuous bonding surface. In the structure of Comparative Example 1, since the conductive bonding portion and the multilayer capacitor having a different coefficient of thermal expansion continuously contacted each other by as much as the Z direction length, thermal stress was applied to the total length in a temperature cycle (TC) environment. On the contrary, in the structure of Reference Example 1, a length of generating the thermal stress by a region where the conductive bonding portion and the multilayer capacitor were not in contact was shortened. Accordingly, deterioration of the conductive bonding portion by the thermal stress was more reduced in Reference Example 1 than in Comparative Example 1.

However, the non-contact region in the conductive bonding portion of Reference Example 1 accompanied deterioration of interface bonding strength, compared with the conductive bonding portion of Comparative Example 1. Herein, the bonding strength deterioration might cause a defect in which the multilayer capacitor was detached form the frame terminal.

On the contrary, Examples 1 and 2, like Comparative Example 1, maintained bonding between the frame terminal and the conductive bonding portion continuously by as much as the Z direction length but reduced a bonding area by discontinuously bonding the conductive bonding portion and the multilayer capacitor only on the interface having a relatively large coefficient of thermal expansion and thus decreased generation of the thermal stress due to the difference in coefficients of thermal expansion. For example, the conductive bonding portion had a coefficient of thermal expansion (CTE) of 20 ppm/° C. to 27 ppm/° C., and the multilayer capacitor had a coefficient of thermal expansion (CTE) of 9 ppm/° C. to 11 ppm/° C.

Experimental Example: Measurement of Bonding Strength of Electronic Components

The electronic components according to Example 1 and Reference Example 1 were measured with bonding strength between the frame terminal and the multilayer capacitor according to a ratio (NB) of an average total area (A) of a protruding portion relative to an average total area (B) of a base portion. Since there was no base portion in Reference Example 1, an average total area (B) of the base portion in Reference Example 1 was replaced with a sum (B') of the average total area (A) of the protruding portions and an average area between the protruding portions.

The bonding strength was evaluated by a detachment rate of the multilayer capacitors after mounting 20 electronic components on a PCB board for each condition, and then applying a force of 10 N to the multilayer capacitors in the Y direction at 1 mm/min for 10 seconds.

Figure 7:
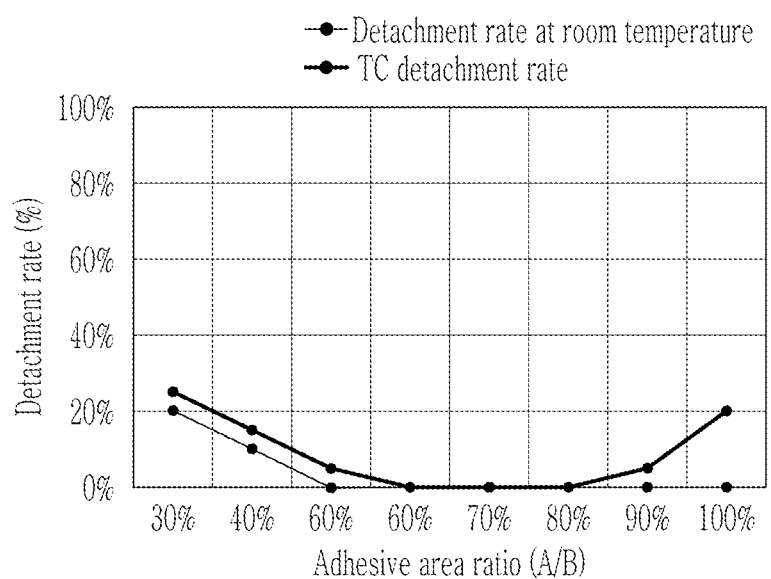
FIG. 7 is a graph showing the evaluation result of bonding strength of the electronic component manufactured in Example 1.
Figure 8:
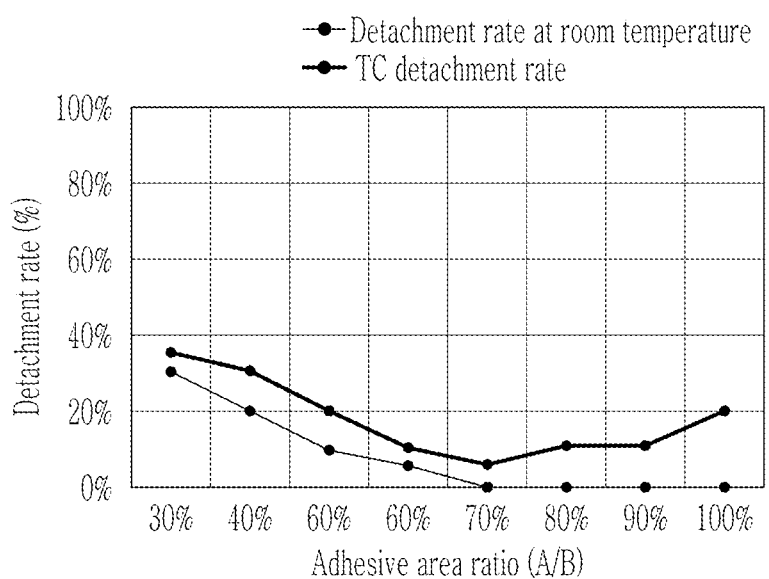
FIG. 8 is a graph showing a result of evaluation of bonding strength of an electronic component manufactured in Comparative Example 2.

In polished cross-sections, when an average total area of a base portion was B and an average total area of a protruding portion was A, bonding strength test results (room temperature detachment rate) depending on an area ratio (NB) at room temperature (25° C.) and bonding strength test results (TC detachment rate) after 2000 temperature cycles (−55° C. to 125° C.) are shown in FIGS. 7 and 8, and is summarized in Table 1.

FIG. 7 is a graph showing the evaluation result of bonding strength of the electronic component manufactured in Example 1, and FIG. 8 is a graph showing the evaluation result of bonding strength of an electronic component manufactured in Comparative Example 2.

TABLE 1

|  |  | Adhesive area ratio (A/B) | | | | | | | |
|---|---|---|---|---|---|---|---|---|---|
|  |  | 30% | 40% | 50% | 60% | 70% | 80% | 90% | 100% |
| Ref. Ex. 1 | Detachment rate at room temperature | 30% | 20% | 10% | 5% | 0% | 0% | 0% | 0% |
|  | TC detachment rate | 35% | 30% | 20% | 10% | 5% | 10% | 10% | 20% |
| Ex. 1 | Detachment rate at room temperature | 20% | 10% | 0% | 0% | 0% | 0% | 0% | 0% |
|  | TC detachment rate | 25% | 15% | 5% | 0% | 0% | 0% | 5% | 20% |

Referring to FIGS. 7 and 8 and Table 1, in the room temperature bonding strength evaluation, Reference Example 1 exhibited detachment of the multilayer capacitors in a region with a bonding area ratio (A/B') of less than or equal to 60% but no detachment of the multilayer capacitors in a region with a bonding area ratio (A/B') of greater than or equal to 70%, where a conductive bonding portion relatively increased. However, in the adhesion strength evaluation after the temperature cycles, the multilayer capacitors were detached in all the regions.

On the contrary, in the room temperature adhesion strength evaluation, although Example 1 had a discontinuous bonding region due to the protruding portions, since the base portion maintained bonding of the frame terminal and the multilayer capacitor, the multilayer capacitors were detached in a region with an adhesive area ratio (NB) of 50%, and even in a region with an area ratio (A/B) of 60% to 80% after the temperature cycles, the multilayer capacitors were not detached.

In other words, referring to the results of Reference Example 1, when a bonding area between the conductive bonding portion and the multilayer capacitor became too small, bonding strength was difficult to secure, but when too large, adhesion strength at room temperature was high, but the conductive bonding portion was deteriorated due to interface thermal stress in the temperature cycle environment. On the contrary, Example 1 maintained bonding strength due to continuous bonding with the frame terminal but minimized a bonding area with the multilayer capacitor having a relatively large difference in coefficients of thermal expansion and thus reduced generation of thermal stress, improving reliability of the conductive bonding portion in all the adhesion strength evaluations at room temperature and after temperature cycles.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An electronic component, comprising:
   a multilayer capacitor including a capacitor body, and an external electrode disposed on one surface of the capacitor body;
   a frame terminal disposed outside the external electrode; and
   a conductive bonding portion disposed between the external electrode and the frame terminal,
   wherein an area in which the conductive bonding portion contacts the frame terminal is larger than an area in which the conductive bonding portion contacts the external electrode,
   an empty space is disposed between the conductive bonding portion and the external electrode.

2. The electronic component of claim 1, wherein
   the conductive bonding portion is in continuous contact with the frame terminal, and
   the conductive bonding portion is in discontinuous contact with the external electrode.

3. The electronic component of claim 1, wherein
   the conductive bonding portion has a base portion contacting the frame terminal and a protruding portion disposed on one surface of the base portion and contacting the external electrode.

4. The electronic component of claim 3, wherein the base portion is spaced apart from the external electrode.

5. The electronic component of claim 3, wherein the protruding portion extends in one direction on the one surface of the base portion.

6. The electronic component of claim 5, wherein the protruding portion extends along a width direction of the capacitor body.

7. The electronic component of claim 5, wherein the protruding portion extends along a thickness direction of the capacitor body.

8. The electronic component of claim 3, wherein the conductive bonding portion has a plurality of protruding portions.

9. The electronic component of claim 8, wherein the plurality of protruding portions are disposed to be spaced apart from each other on the one surface of the base portion.

10. The electronic component of claim 8, wherein two of the plurality of protruding portions are disposed at both ends on the one surface of the base portion.

11. The electronic component of claim 8, wherein the plurality of protruding portions have a patterned shape.

12. The electronic component of claim 11, wherein the plurality of protruding portions have a stripe shape.

13. The electronic component of claim 11, wherein the plurality of protruding portions have a mesh shape.

14. The electronic component of claim 3, wherein a ratio (A/B) of an average total area (A) of the protruding portions to an average total area (B) of the base portion is greater than or equal to about 30% and less than about 100%.

15. An electronic component, comprising:
a multilayer capacitor including a capacitor body, and an external electrode disposed on one surface of the capacitor body;
a frame terminal disposed outside the external electrode; and
a conductive bonding portion disposed between the external electrode and the frame terminal,
wherein the conductive bonding portion is in continuous contact with the frame terminal and in discontinuous contact with the external electrode, and
an empty space is disposed between the conductive bonding portion and the external electrode.

16. The electronic component of claim 15, wherein the conductive bonding portion has a base portion contacting the frame terminal and a protruding portion disposed on one surface of the base portion and contacting the external electrode.

17. The electronic component of claim 16, wherein the conductive bonding portion has a plurality of protruding portions.

18. The electronic component of claim 17, wherein the plurality of protruding portions are disposed to be spaced apart from each other on the one surface of the base portion.

19. An electronic component, comprising:
a multilayer capacitor including a capacitor body, and an external electrode disposed on one surface of the capacitor body;
a frame terminal disposed outside the external electrode; and
a conductive bonding portion disposed between the external electrode and the frame terminal,
wherein in a direction from the external electrode towards the frame terminal, the electronic component includes a region, in which the external electrode is spaced apart from the conductive bonding portion and in which the conductive bonding portion is in contact with the frame terminal.

* * * * *